United States Patent
Baron, Sr. et al.

(10) Patent No.: US 6,493,633 B2
(45) Date of Patent: Dec. 10, 2002

(54) SYSTEMS AND METHODS FOR DISTRIBUTING REAL-TIME SITE SPECIFIC WEATHER INFORMATION

(76) Inventors: Robert O. Baron, Sr., 5725 Tannahill Cir., Huntsville, AL (US) 35801; Tom S. Thompson, 26928 Oak Rd., Athens, AL (US) 35613; Tony L. Benson, 4710 Grantland, Huntsville, AL (US) 35810

( * ) Notice: Subject to any disclaimer, the term of this patent is extended or adjusted under 35 U.S.C. 154(b) by 0 days.

(21) Appl. No.: 09/834,989

(22) Filed: Apr. 13, 2001

(65) Prior Publication Data

US 2002/0004705 A1 Jan. 10, 2002

Related U.S. Application Data

(63) Continuation-in-part of application No. 09/490,671, filed on Jan. 24, 2000, which is a continuation of application No. 08/869,269, filed on Jun. 4, 1997, now Pat. No. 6,018,699.
(60) Provisional application No. 60/018,921, filed on Jun. 4, 1996.

(51) Int. Cl.[7] ............................................. G06F 169/00
(52) U.S. Cl. .......................................................... 702/3
(58) Field of Search ....................... 702/3, 4, 5; 342/26; 706/931

(56) References Cited

U.S. PATENT DOCUMENTS

| | | | |
|---|---|---|---|
| 3,701,024 A | 10/1972 | Knowles et al. | |
| 4,277,845 A | 7/1981 | Smith et al. | |
| 4,347,618 A | 8/1982 | Kavouras et al. | |
| 4,415,771 A | 11/1983 | Martinez | |
| 4,435,843 A | 3/1984 | Eilers et al. | |
| 4,521,857 A | 6/1985 | Reynolds III | |
| 4,725,886 A | 2/1988 | Galumbeck et al. | |
| 5,023,934 A | 6/1991 | Wheeless | |
| 5,045,850 A * | 9/1991 | Andros et al. | 340/825.44 |
| 5,121,430 A | 6/1992 | Ganzer et al. | |
| 5,140,419 A | 8/1992 | Galumbeck et al. | |
| 5,272,465 A | 12/1993 | Meares, Jr. | |

(List continued on next page.)

OTHER PUBLICATIONS

Gilhousen, D.B., "Methods of Obtaining Weather Data in Real Time", Oceans '88: A Partnership of Marine Interests, vol. 4, Nov. 1988, pp. 1341–1343.

*Primary Examiner*—Donald E. McElheny, Jr.
(74) *Attorney, Agent, or Firm*—Lanier Ford Shaver & Payne, P.C.; Frank M. Caprio; Do Te Kim

(57) ABSTRACT

An event notification system in accordance with the present invention includes a computer system configured to receive data indicative of an event to be warned for and to process the data to define a boundary for an area affected by the event. A distribution site communicates with the computer system to distribute information indicative of the boundary of the area affected by the event to a plurality of devices remote from the distribution site and each other. The plurality of remote devices communicate with the distribution site to receive information indicative of the boundary of the area affected by the event and each is configured to determine if it is affected by the event and to respond accordingly. A method of remotely activating a warning device in response to an event notification is also disclosed.

71 Claims, 8 Drawing Sheets

```
Tony Benson
From:   <saftnet@baronservices.com>
To:
Sent:   Tuesday, April 10, 2001 4:02 PM
Subject: SafTNet Storm Report- GSP SAF-T-NET storms reported from GSP
04/10/2001 16:02:28
[Storm0]
Time=Tue Apr 10 16:02:28 2001
Alternate Time=986936548
ID=D0a
Contents=SafTNet/HailCore
StormLat=36.517875
StormLon=-80.927729
alternateStormPathLat=36:31:04 N
alternateStormPathLon=80:55:40 W
StormPathLat1=36.517875
StormPathLon1=-80.877361
alternateStormPathLat1=36:31:04 N
alternateStormPathLon1=80:52:38 W
StormPathLat2=36.517875
StormPathLon2=-80.978096
alternateStormPathLat2=36:31:04 N
alternateStormPathLon2=80:58:41 W
StormPathLat3=36.521416
StormPathLon3=-80.877361
alternateStormPathLat3=36:31:17 N
alternateStormPathLon3=80:52:38 W
StormPathLat4=36.521416
StormPathLon4=-80.978096
alternateStormPathLat4=36:31:17 N
alternateStormPathLon4=80:58:41 W
Approval=1 (Automatically aproved by content
at 16:02:28 04/10/01 )
```

U.S. PATENT DOCUMENTS

| | | | |
|---|---|---|---|
| 5,278,539 A | | 1/1994 | Lauterbach et al. |
| 5,379,215 A | | 1/1995 | Kruhoeffer et al. |
| 5,398,021 A | * | 3/1995 | Moore ..................... 340/82.27 |
| 5,444,433 A | | 8/1995 | Gropper |
| 5,448,618 A | | 9/1995 | Sandlerman |
| 5,481,254 A | * | 1/1996 | Gaskill et al. ......... 340/825.52 |
| 5,517,193 A | | 5/1996 | Allison et al. |
| 5,533,094 A | | 7/1996 | Sanmugam |
| 5,555,446 A | * | 9/1996 | Jasinski ..................... 455/54.2 |
| 5,568,385 A | | 10/1996 | Shelton |
| 5,574,999 A | * | 11/1996 | Gropper ................. 455/186.1 |
| 5,583,972 A | | 12/1996 | Miller |
| 5,717,589 A | | 2/1998 | Thompson et al. |
| 5,790,953 A | * | 8/1998 | Wang et al. ................ 455/435 |
| 5,805,156 A | | 9/1998 | Richmond et al. |
| 5,974,360 A | | 10/1999 | Otsuka et al. |
| 5,978,738 A | | 11/1999 | Brown |
| 6,021,177 A | * | 2/2000 | Allport |
| 6,052,648 A | | 4/2000 | Burfeind et al. |
| 6,076,044 A | | 6/2000 | Brown |
| 6,088,636 A | * | 7/2000 | Chigumira et al. ........... 701/26 |
| 6,100,897 A | | 8/2000 | Mayer et al. |
| 6,104,582 A | | 8/2000 | Cannon et al. |
| 6,112,074 A | | 8/2000 | Pinder |
| 6,112,075 A | | 8/2000 | Weiser |
| 6,252,539 B1 | | 6/2001 | Phillips et al. |
| 6,255,953 B1 | | 7/2001 | Barber |

\* cited by examiner

Tony Benson

From: <saftnet@baronservices.com>
To:
Sent: Tuesday, April 10, 2001 4:02 PM
Subject: SafTNet Storm Report- GSP

```
SAF-T-NET storms reported from GSP
04/10/2001 16:02:28
[Storm0]
Time=Tue Apr 10 16:02:28 2001
Alternate Time=986936548
ID=D0a
Contents=SafTNet/HailCore
StormLat=36.517875
StormLon=-80.927729
alternateStormPathLat=36:31:04 N
alternateStormPathLon=80:55:40 W
StormPathLat1=36.517875
StormPathLon1=-80.877361
alternateStormPathLat1=36:31:04 N
alternateStormPathLon1=80:52:38 W
StormPathLat2=36.517875
StormPathLon2=-80.978096
alternateStormPathLat2=36:31:04 N
alternateStormPathLon2=80:58:41 W
StormPathLat3=36.521416
StormPathLon3=-80.877361
alternateStormPathLat3=36:31:17 N
alternateStormPathLon3=80:52:38 W
StormPathLat4=36.521416
StormPathLon4=-80.978096
alternateStormPathLat4=36:31:17 N
alternateStormPathLon4=80:58:41 W
Approval=1 (Automatically aproved by content
at 16:02:28 04/10/01 )
```

FIG. 7

SYSTEMS AND METHODS FOR DISTRIBUTING REAL-TIME SITE SPECIFIC WEATHER INFORMATION

RELATED APPLICATIONS

This application is a continuation-in-part of U.S. application Ser. No. 09/490,671, filed Jan. 24, 2000, which is a continuation of U.S. application Ser. No. 08/869,269, filed Jun. 4, 1997, now U.S. Pat. No. 6,018,699, which claims the benefit of U.S. Provisional Application No. 60/018,921, filed Jun. 4, 1996.

BACKGROUND OF INVENTION

1. Field of the Invention

The present invention generally relates to systems and methods for event identification, forecasting, and notification, and more particularly, to computerized systems and methods for reporting and forecasting real-time weather information.

2. Technical Background

The importance of weather reporting and forecasting in our daily lives cannot be contested. A large percentage of the people in the United States watch their local evening news on a nightly basis to see the local weather report and forecast. This information may then used to make decisions for the next day, or for the upcoming weekend, such as what to wear, what activity to participate in, what activity not to participate in, what to bring on an outing, etc. Under certain circumstances, such as in the case of severe weather, some people may find themselves in situations where they are making life and death decisions based upon the weather information they have available to them.

To assist local television stations, as well as the national networks, in providing accurate and timely weather reporting and forecasting, the National Weather Service (NWS) maintains a network of radar installations located at approximately one hundred thirty-eight sites throughout the United States. Observers at each of these installations monitor the weather conditions within their area and provide hourly teletyped messages to subscribers, typically through a third party weather service provider such as GTE Contel, a subsidiary of GTE Government Systems. In addition, other services provide lightning strike information on a subscription basis, such as through Global Atmospherics, Arizona, U.S.A.

The weather information provided by any one or a combination of the above services may be synthesized at a local television station into a understandable format for presentation to the public. In general, the meteorological data is gathered at the local television station and combined with image maps of a geographical region to generate a weather image i.e., a graphical illustration of the weather. In addition, the local temperatures for various communities or cities within the viewing area of the station may also be generated on the weather image. A sequence of these composite weather images can be looped to create weather animation. The local television station may then broadcast the weather images to viewers.

Although the current weather reporting and forecasting systems used by television stations and networks have much benefit, they may not provide relevant weather information during severe weather. This is particularly true when it comes to the existence of severe weather which arises quickly without much warning, as is often the case with tornadoes. It is well known that tornadoes and other types of severe weather can strike quickly without much prior notice. The information provided by the television stations and networks regarding these types of severe weather are seldom provided in a real-time fashion and are generally not detailed as to the specific location or direction of the weather front. Therefore, the public is often not given sufficient warning to adequately prepare for the weather in order to protect their property or find a safe refuge for themselves. Moreover, the weather information that is provided is often provided on a county wide basis which, depending on the size of the county, the actual path of the severe weather through a county, and the position of the listeners within the county, may be irrelevant. The listener may consequently become impatient or inattentive, and stop viewing the weather report.

An alternative source of weather information is through weather radios such as the Realistic Weather Radio Alert III, Model No. 12-140, distributed through Radio Shack, a division of the Tandy Corporation. In general, weather radios may provide listeners with prerecorded or live weather updates on an essentially continuous basis. The weather radios receive the weather information updates which are broadcasts by the national Weather Service (NWS) from local transmitters using specific frequencies designated by the Federal Communication Commission (FCC). The weather updates usually comprise regular weather information which is prerecorded and then broadcast, except for the issuance of severe weather watches or warnings. In those cases, a prerecorded (or sometimes live) watch or warning message is preceded by a tone (e.g., a 1,000 cycle tone) that is manually activated at the broadcast station. The tone weather radios that are turned on and within the range of the broadcasted signal may receive the tone which activates an audible alarm on the radio. The audible alarm is typically not distinctive as to the whether it is for a watch and warning, nor does the audible alarm indicate the type or severity of the severe weather. The alarm will usually continue until the user pushes an alert key or button on the weather radio. It is noted that NWS personnel are responsible for both manually recording of the audio messages for broadcast and the manually activating of the tone.

What is needed therefore, but presently unavailable in the art, is a system and method capable of broadcasting, among other things, information indicative of a narrowly defined boundary for an event and/or a projected path of an event to a plurality of remote devices that are positioned throughout the area of coverage of the system, and which are each configured to independently determine if it is affected by the event. In a preferred embodiment, those devices determining that they are affected by the event will respond to the broadcast by activating an alert indicator of some type while those devices determining that they are not affected by the event will not respond to the broadcast. Such a system and method should be capable of broadcasting the information in real-time over the entire coverage area of the system, and should include smart devices that perform the alerting function. Each smart device should itself be configured to independently determine if it is affected by the event rather than being instructed from a central location that it is affected. Each remote device should preferably be programmed or otherwise provided with information indicative of its geographic location so that each may compare its known location against geographically coded information provided in the broadcast which defines the boundaries of the event or events. The system should be capable of alerting stationary devices that are positioned, for example, within buildings such as schools and homes, as well as mobile devices such as those carried on a person or positioned in a moving vehicle. While the system and method of the present invention is particularly well suited for events such as severe storms or other weather conditions, it is equally applicable to the dissemination of information pertaining to events such as chemical or other toxic discharges, forest fires, nuclear accidents, and other emergency events where early warning of the event can provide those in harms way with ample advance notice to prepare for the event. It is to the provision of such a system and method that the present invention is primarily directed.

SUMMARY OF THE INVENTION

It is therefore an object of the present invention to provide more relevant weather information.

It is another object of the present invention is to provide site specific weather information.

It is a further object of the present invention is to provide substantially real-time weather information.

These and other objects are provided in accordance with one aspect of the present invention by a system for providing real-time site specific weather information that includes a weather alert manager that receives meteorological data and combines the meteorological data with a geographical grid covering a predefined geographic area to produce storm profiles for the storms within the geographical area, wherein the geographic grid partitions the geographic area into a plurality of cells. A distribution network distributes the storm profiles to remote units that are responsive to the storm profiles. The remote units are configured to process the storm profiles and present real-time site specific weather information based upon the storm profile. The storm profiles may include a cell identifier that identifies a cell of the geographic grid that is affected by the storm. In addition, the storm profiles may further include a storm identifier, a storm type identifier, a list of cells affected by the storm and a presence qualifier associated with each cell identified.

The storm distribution network preferably distributes the storm profiles to the remote units that are associated with the cells affected by the storm. For instance, a remote unit may receive storm profiles for a storm that is currently located within the present cell, or likely to cross the present cell. The distribution network may include means for addressing the storm profile to enable point-to-point distribution to the respective cells associated with a storm. The distribution network may comprise a land-line telephone network, a universal wireless network, a pager network, an Internet, or a local cable television network.

In accordance with another aspect of the present invention, the meteorological data received by the weather alert manager comprises indications of the storm's speed, location, direction, and type. Further, the meteorological data may include a severity indicator of a storm. The meteorological data may be provided manually by a user such as someone from an emergency management agency, or automatically by a NexRad attributes data provider, or a combination of both manually and automatically gathered weather data.

The remote units may include an audible alarm that can be selectively actuated to distinguish between a warning alarm and a watch alarm. Further, the remote units may include an audible alarm that is selectively actuated to indicate a storm type. Alternatively, the remote units may include an visual indicator that may be selectively actuated to distinguish between a warning alarm and a watch alarm, and/or a visual indicator that is selectively actuated to indicate a storm type.

The weather alert manager may include means for predicting a path of the storm based upon the meteorological data. For example, the means for predicting a path of the storm may comprise a NexTrac® computer program from Baron Services, Huntsville, Ala., USA.

In accordance with another embodiment of the present invention, a method for providing real-time site specific weather information comprises the steps of receiving meteorological data, and combining the meteorological data with a geographical grid covering a predefined geographic area to produce a storm profile for a storm identified in the meteorological data, wherein the geographic grid partitions the geographic area into a plurality of cells. The method also includes the step of distributing the storm profile to a remote unit that is responsive to the storm profile for presenting real-time site specific weather information. The step of combining the meteorological data with a geographical grid to produce a storm profile may include producing the storm profile with a cell number that identifies a cell of the geographic grid that is affected by the storm. The method may further include the step of producing visual and/or audio alarms that can be selectively actuated by the remote units in response to the storm profiles in order to distinguish between warning alarms and watch alarms, and/or the type of the storm (e.g., thunder, hail, tornado, etc.). The method may also include the step of providing a severity indicator of said storm as a part of said meteorological data. Further, the step of combining said meteorological data with a geographical grid covering a predefined geographic area includes predicting a path of the storm based upon the meteorological data.

In another aspect, the present invention relates to an event notification system. The event notification system of the present invention includes a computer system configured to receive data indicative of an event to be warned for and to process the data to define a boundary for an area affected by the event. A distribution site communicates with the computer system to distribute information indicative of the boundary of the area affected by the event to a plurality of devices remote from the distribution site and each other. The plurality of devices communicate with the distribution site to receive the information indicative of the boundary of the area affected by the event and each of the plurality of devices is configured to process the received information to determine if it is affected by the event and to respond accordingly.

In yet another aspect the present invention is directed to an event notification system. The event notification system of the present invention includes a weather alert manager configured to receive data indicative of an event to be warned for and to process the data to define a location of the event. A distribution site communicates with the weather alert manager to distribute data indicative of the location of the event to a plurality of devices remote from the distribution site and each other. The plurality of devices receive the data indicative of the location of the event, and each of the plurality of devices is configured to determine if it is affected by the event and respond accordingly.

A further aspect of the present invention relates to a method of remotely activating a device. The method of remotely activating a device in accordance with the present invention includes the steps of receiving data indicative of an event to be warned for, processing the received data to define a boundary for an area affected by the event, and distributing information indicative of the boundary of the area affected by the event to a plurality of remote devices. Each of the plurality of remote devices is configured to determine if it is affected by the event and respond accordingly.

The event notification embodiment of the present invention provides a number of advantages over other systems and methods currently known in the art. For example, the system and method of the present invention preferably incorporates smart remote devices, each of which independently determines whether it is affected by a given event notification. As a result, the system and method of the present invention is not tasked with determining which one or more of the remote devices should receive an event notification. Instead, the system of the present invention may distribute a single event notification to all remote devices within the systems area of coverage. This information can then be processed by each remote device so that the remote devices themselves may determine if they are affected by the event.

In addition, the event notification embodiment of the present invention reduces system overhead as a database of remote device locations is not required to be maintained and queried by the computer system or weather alert manager of the present invention in order to route multiple event notifications. Accordingly, system operating expenses and maintenance expenses are reduced, as are the number of misdirected event notifications and false remote device activations.

Another advantage of the system and method of the present invention relates to the manner in which an event notification may be distributed. Generally speaking, since a single event notification can be transmitted to the entire area of coverage of the system at a single point in time, an event notification may be broadcast using a Radio Frequency (RF) signal. Since very little information pertaining to the event is necessary for any given notification, the data relating to the characteristics of the event can be processed and transmitted quickly, essentially real-time, and due in part to the low overhead of the transmission, the broadcast itself is extremely short in duration.

Yet another advantage of the event notification system and method of the present invention relates to the additional capabilities of the remote devices. The remote devices of the present invention may be configured, for example, to provide an audible alarm or tone, a visual alert such as a light or strobe light, text messages, graphical displays, and/or voice messages, either live or via some type of pre-recorded wave file. In addition, each remote device may be configured to communicate with a Global Positioning System (GPS) or other location determining device so that each remote device is operative in a moving vehicle or otherwise during transport.

These and additional features and advantages will be set forth in the detailed description which follows, and in part will be readily apparent to those skilled in the art from that description or recognized by practicing the invention as described herein.

It is to be understood that both the foregoing general description and the following detailed description are merely exemplary of the invention, and are intended to provide an overview or framework for understanding the nature and character of the invention as it is claimed. The accompanying drawings are included to provide further understanding of the invention, illustrate various embodiments of the invention, and together with the description serve to explain the principles and operation of the invention.

BRIEF DESCRIPTION OF THE DRAWINGS

The present invention can be better understood with reference to the following drawings. The elements of the drawings are not necessarily to scale, emphasis instead being placed upon clearly illustrating the principles of the present invention. Furthermore, like reference numerals designate corresponding parts throughout the several views.

FIG. 7 is an exemplary e-mail message provided by the server of the system depicted in FIG. 6.

DETAILED DESCRIPTION OF THE PREFERRED EMBODIMENTS

A system for distributing real-time site specific weather information to multiple users in accordance with the present invention has many uses in many different contexts, such as, at a golf course, a shopping mall, a school, an office building, or in a home. The real-time site specific weather information may be distributed by any number of communication mediums such as a wireless network, a land-line telephone network, or a television cable network. Accordingly, the present description of the preferred embodiments is not to be taken in a limiting sense but is made merely for the purpose of describing the general principles of the invention. The embodiments described are provided so that the disclosure will be thorough and complete, and will fully convey the scope of the invention to those skilled in the art.

I. System Architecture

Figure 1:
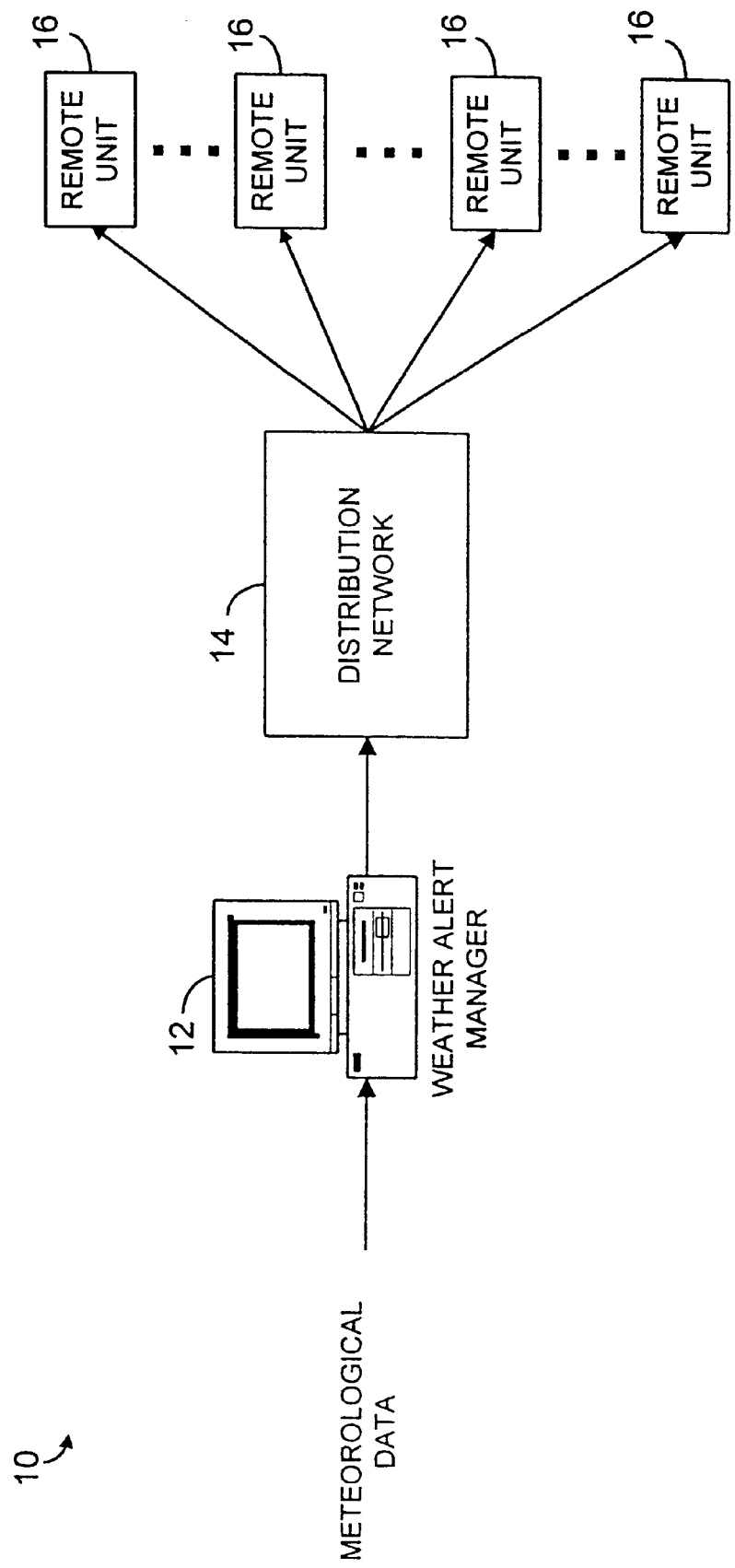
FIG. 1 is a schematic illustration of a system for distributing real-time site specific weather information.

With reference to FIG. 1, a system 10 for providing real-time site specific weather information in accordance with the present invention is illustrated. The system 10 comprises a weather alert manager 12, a distribution network 14, and a plurality of remote units 16. Briefly stated, the system 10 receives meteorological data including weather information for a geographic area which is relevant to one or more of the remote units 16. The meteorological data is processed to generate storm profiles for the storms within the meteorological data. The storm profiles are distributed to the respective remote units 16 by the distribution network 14. In response to the storm profiles, the remote units provide weather information that is relevant to a specific geographic area predefined for each remote unit 16. Accordingly, an end user is able to receive site specific weather information that is highly relevant.

Figure 2:
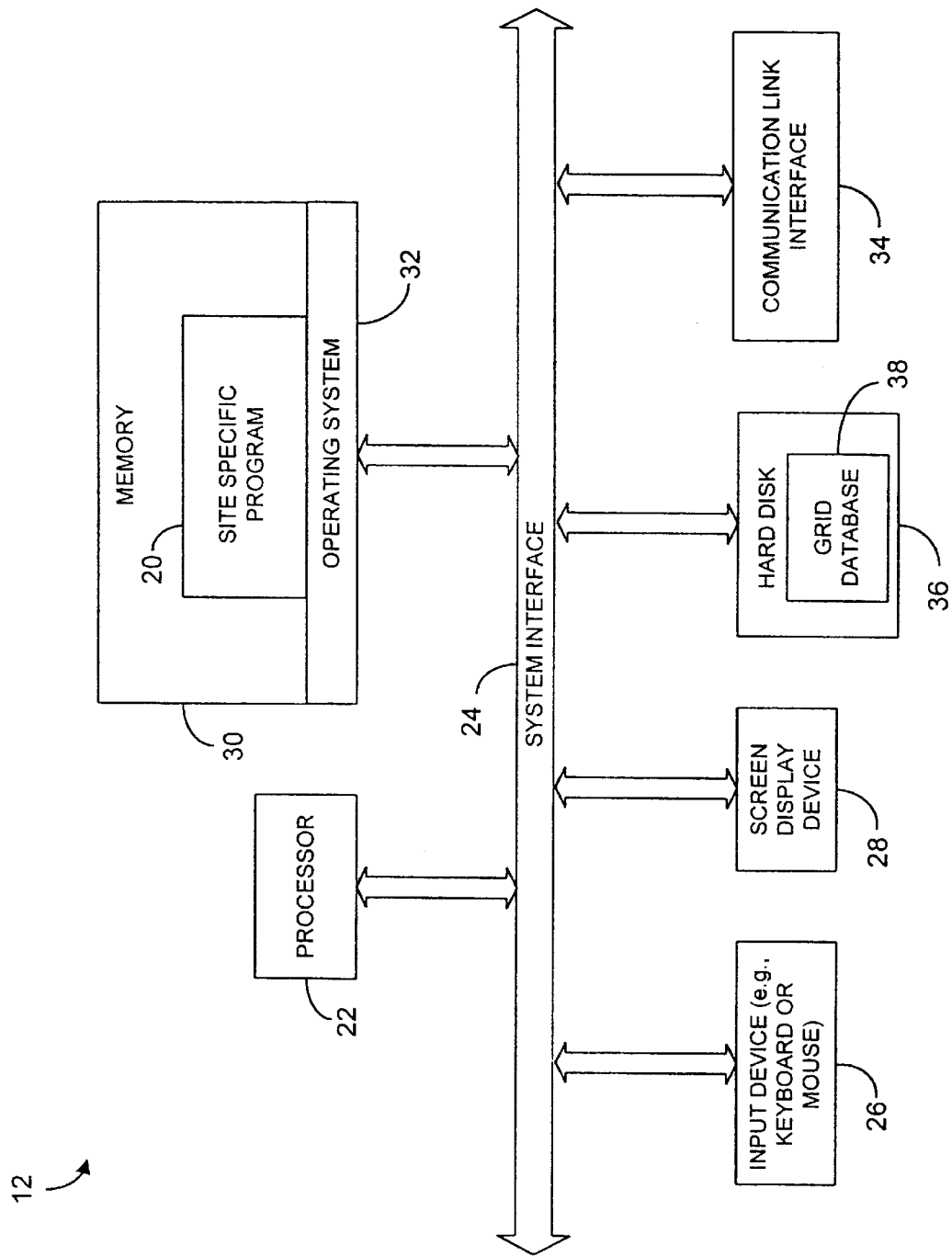
FIG. 2 is a block diagram illustrating the architecture and functionality of the weather alert manager of the system of FIG. 1.

An example of a configuration of the weather alert manager 12 is provided by the block diagram of FIG. 2. The weather alert manager 12 includes a site specific program 20 in accordance with the present invention. As shown, the weather alert manager 12 is preferably configured as a special purpose computer or other apparatus suitable for executing the program code embodied within the site specific program so as to impart the functionality described herein and those other functionalities necessary for the operation of the present invention as would be obvious to one of ordinary skill in the art. The weather alert manager 12 further includes a processor 22 that can communicate with the other elements within the weather alert manager 16 via system interface 24. An input device 26, for example, a keyboard or mouse, is used to input data from the user, and a screen display device 28, for example, a monitor, is used to output data to the user. A memory 30 within the weather alert manager 12 contains the site specific program 20 for imparting the functions described herein. In addition, the memory 30 includes a conventional operating system 32 that communicates with the site specific program 20 and enables execution of the site specific program 20 by the processor 22. A communication link interface 34 is provided for interfacing the weather alert manager 12 with other related systems for purposes such as receiving meteorological data or transmitting storm profiles to the distribution network 14. Lastly, a hard disk 36 is provided as a nonvolatile memory for storing information such as a grid database 38 as described in more detail below.

The weather alert manager 12 is configured to receive meteorological data via communication link interface 34, or alternatively, via manual input through input device 26. The meteorological data may be provided by a variety of sources, but preferably comprises NexRad attribute data. NexRad is a weather service provided by the National Weather Service (NWS) which employs a system of high powered radars scattered throughout the country which collect data that is synthesized for distribution to subscribers. The NexRad attribute data is distributed by several providers which can communicate the data via a satellite downlink or over a communication network connection such as a telephone line. Several of the NexRad providers are: Alden Electronics, Westborough, Mass., USA; UNISYS, Philadelphia, Pa., USA; and Weather Services International (WSI) Corporation, Billerica, Mass., USA. The NexRad attributes data provides subscribers with detailed information concerning storms detected by the NexRad radar sites. The NexRad attribute data may include the following information for each storm:

| | |
|---|---|
| ID | A unique 3-digit identifier for the storm. |
| AZ | The direction of the storm in degrees from the radar source. |
| RANGE | The distance of the storm in nautical miles from the radar source. |
| TVS | The likelihood of a tornado vortex signature (probably, possible or absolutely). |
| MESO | The likelihood of mesocyclonic activity (probable, possible or absolutely). |
| HAIL | The likelihood of hail (probably, possible or absolutely). |
| DBZM | The maximum DBZ level (a measurement of participation intensity) in the storm. |
| FCST_ANGLE | Forecasted movement angle (storm path) in degrees. |
| FCST_MVMT | Forecasted movement speed in nautical miles per hour. |

A feature of NexRad data is that it can be automatically downloaded and provided to the weather alert manager without human interaction. Further, the different NexRad attributes can be combined to provide other attributes such as storm type, storm width, or storm severity. For example, the NexRad attributes TVS, MESO and HAIL may be utilized to provide an attribute for storm type. As another example, the NexRad attribute DBZM may be utilized to provide an attribute for storm width. As yet another example, the NexRad attributes TVS, MESO, HAIL and DBZM may be utilized to provide an attribute for storm severity.

In addition, the meteorological data may comprise manually inputted information regarding a storm. Preferably, this information is provided by the emergency management agency (EMA) or another similar entity such as a local 911 service charged with weather warnings. This allows for human reasoning to evaluate the severity of a storm so that factors not easily considered in an automated system may be considered. Examples of factors that may be considered in such circumstances include the terrain of the local area or the presence of high risk structures in the path of a storm such as a school or shopping mall. Thus, the storm attributes provided in the NexRad attributes can be alternatively provided manually.

The meteorological data received by the weather alert manager 12 is processed by the site specific program 20. Particularly, the site specific program 20 performs storm tracking functions on the storms that are identified by the meteorological data, and that are within the geographic region of interest. Systems capable of performing storm tracking functions, such as those required in the present system, which are commercially available include the Nex-Trac® system by Baron Services, Inc., Alabama, USA, or Storm Pro by Kavouras, Minnesota, USA.

There are essentially two methods of performing storm tracking operations. A first method involves gathering historical data of a particular storm so that the storm's direction and speed can be derived from the location of the storm at two discrete points in time which are recorded in the historical data. A direction of the storm can then be determined by a direction vector passing through the two locations of the storm. The speed of the storm can be determined from the distance between the two points and the time that it took the storm to travel between the two points. From the direction and speed, the location of the storm at some future point in time can be mapped out within an acceptable degree of accuracy. A second method includes retrieving the NexRad attributes FCST_ANGLE and FCST_MVMT, and then calculating the storm's position after a predefined period of time based upon these attributes, as described in detail below.

Initially, the NexRad attributes RANGE and AZ are utilized to determine a current x coordinate range and a current y coordinate range for the storm with respect to the NexRad radar site that is tracking the storm. The x and y coordinate ranges can then be utilized with the latitude and longitude coordinates of the NexRad radar site to determine a true location of the storm in latitude and longitude measurements. The latitude and longitude of the storm can be combined with the NexRad attributes FCST_ANGLE (i.e., forecasted direction) and FCST_MVMT (i.e., forecasted speed) to derive a position of the storm after a predetermined period of time.

In addition to determining a future position of the storm, the storm tracking function of the present invention includes tracking the width and fanout of the storm. The width can be determined from the NexRad attributes as described above, and the fanout is user defined. For purposes of the present disclosure, the fanout of a storm is the rate at which the storm track widens from the base of the storm to the end of the track. This parameter is preferably set between approximately 10 and 20 percent per meter. The fanout is essential an error factor that allows the future path of the storm to be determined with a greater tolerance. That is, the geographic area over which a storm may travel is more likely to be within a predicted path that accounts for a 10 percent widening of the storm as it moves. The fanout can be varied between two instances of the storm tracking operation for the same storm to create qualifiers that indicate the likelihood that the storm will affect a particular cell. These qualifiers are referred to hereafter as presence qualifiers. As an example, a storm tracking operation performed on a storm with 10 percent fanout may result in ten cells that the storm will "probably" cross. If the storm tracking operation were performed a second time with a fanout of 20 percent, then the results may include twenty or more cells that the storm may "possibly" cross. Thus, the weather information that can be delivered to the end user at the remote unit 16 is both relevant and informative.

The site specific program 20 then combines the storm tracking information with a geographic grid to determine which location(s) within the geographic grid are affected by the storm. The geographic grid comprises a geographic region that is divided into a plurality of cells that are individually identified by a unique identification number. Each cell preferably comprises at least one latitude coordinate and one longitude coordinate, though the size of the cells can be defined by the user. By comparing the coordinates defining the predicted path of the storm to the geographic grid on a cell by cell basis, each cell within the grid that is affected by the storm can be identified. Furthermore, by running multiple instances of the storm tracking with different fanout settings, presence qualifiers can be determined for the identified cells that the storm is currently crossing, probably approaching, or possibly approaching.

The site specific program 20 then generates a storm profile for the storms identified in the meteorological data. The storm profiles generated by the site specific program 20 preferably include a storm type identifier, a severity indicator, and a list of cell numbers and associated presence qualifiers such as "in this cell," "possibly approaching this cell," or "probably approaching this cell." The storm identifier is provided by the NexRad attribute ID, the severity indicator is either manually inputted by the EMA or automatically generated from one or more of the NexRad attributes, and the cell numbers and presence qualifiers are determined as described above. A data structure comprising a storm profile may appear as follows:

| storm ID | storm type | storm severity | Cell#/ presence qualifier | . . | cell#/ presence qualifier |
|---|---|---|---|---|---|

Accordingly, a storm profile is a relatively small amount of data that can be transmitted as a serial bit stream to the remote units 16 with low overhead on the part of the distribution network 14.

The distribution network 14 is configured to deliver the storm profiles to the respective remote units 16. Because the storm profiles require so little bandwidth for transmission to the remote units, updated storm profiles information can be sent out to subscribers at a high frequency to ensure the weather information is real-time.

Preferably, the storm profiles are distributed according to an address integrated in the protocol overhead or the storm profile itself such as in an address field so that the remote units only respond to storm profiles that particularly identify cells which are associated with that remote unit 16. This can be accomplished by maintaining an end user database at the weather alert manager 12 that associates each end user to one or more of the cells. Thus, by cross referencing the cell numbers in a profile to a list of end users with associated cells, the specific end users that should be sent a storm profile can be identified. By identifying the end user, the remote unit 16 associated with that end user may be identified. The profiles may then be sent to the end user directly in a point-to-point communication utilizing the address. Alternatively, if the remote units 16 are configured to be responsive to specific address(es), then the profiles may be broadcast to all the remote units. The addresses in this case may be merely the cell numbers, and thereby, eliminate the need to provide a special address field to the data structure comprising the storm profile. The end user database may also identify the means by which the profile is to be sent to the subscriber (e.g., a cellular phone call with recorded message or a pager with an alpha numeric message).

The distribution network 14 can be implemented by a variety of different communication mediums such as, but not limited to, wireless, cable television, pager, land-line telephone, satellite, etc. This flexibility in the method by which the storm profiles are delivered by the distribution network is advantageous because it enables the subscriber to chose the most convenient method of delivering the site specific weather information of the present invention. The communication medium chosen may be based upon pricing tariffs, Federal Communications Commission (FCC) regulations, available technology, or the configuration of the remote unit (as described below). An example of one configuration for the distribution network 14 is a wireless network that initiates a call based upon a number (i.e., address) that the weather alert manager 12 retrieved from a subscriber database. The wireless network then makes a call to the remote unit 16 associated with that wireless telephone number for sending a storm profile to the remote unit 16 which processes the information for presentation to the subscriber in real-time.

The remote unit 16 is configured to receive a storm profile and respond thereto by providing audio and/or visual indicators which convey relevant storm information such as the type of storm, the severity of the storm, and the relevance of the storm with regard to the location of the remote unit 16. The remote unit 16 may be located throughout the geographic region covered by the geographic grid utilized by the weather alert manager 12. For instance, the remote units 16 may be located in a private home, a public facility such as a shopping mall or golf course, an office building, a school, or even a mobile vehicle such as a bus, taxicab, or plane.

Figure 3:
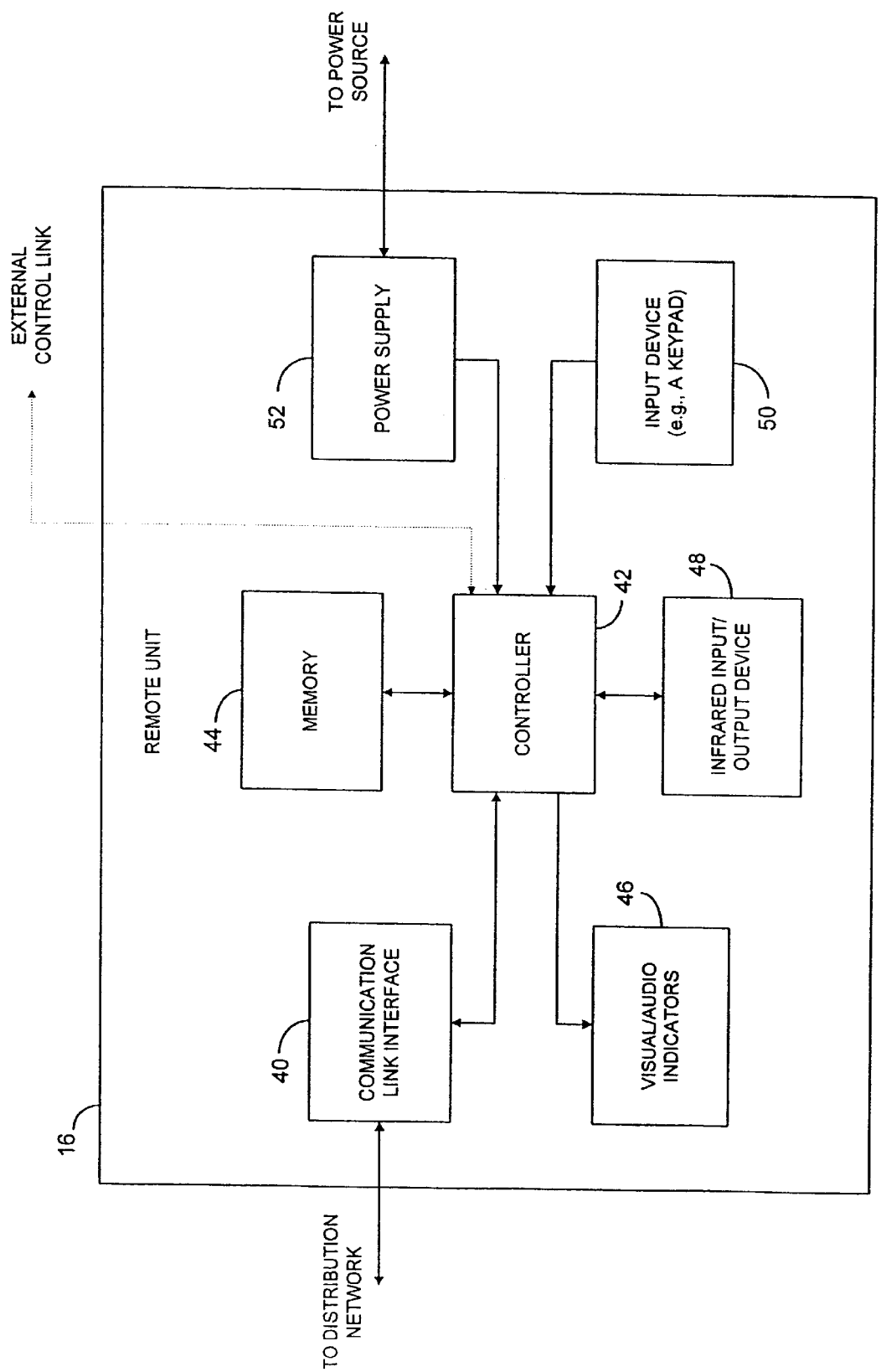
FIG. 3 is a block diagram of the remote unit of the system of FIG. 1.

An illustrative example of a configuration of a remote unit 16 is provided in FIG. 3. As shown, the remote unit 16 comprises a communication interface 40, a controller 42, a memory 44, an audio/video indicator mechanism 46, an infrared input/output device 48, an input device 50, and a power supply 52. The communication link interface 40 provides an interface to the distribution network 14 for receiving storm profiles in accordance with the present invention. The storm profiles are provided to the controller 42 which includes the control logic for operation of the remote unit 16. Briefly stated, the controller 42 processes the storm profile by parsing the data structure and making logical determinations as to the type/manner of weather information that will be provided to the subscriber via the visual/audio indicator mechanism 46. The control 42 may also include control logic for discriminating between storm profiles to ensure that the remote unit 16 only responds to storm profiles associated with its subscriber. As previously mentioned, this may include identifying an address field within the storm profile and comparing that with a programmed address, or alternatively, comparing the cell numbers within the storm profile with programmed cell numbers. On the other hand, the remote unit 16 may only receive storm profiles that are specifically addressed to it, and therefore, the remote unit 16 can process each storm profile it receives without having to evaluate its relevance.

The visual/audio indicator mechanism 46 provides means by which to convey the site specific weather information in the storm profile to the end user. The visual/audio indicator mechanism 46 may include a speaker device for providing audio indication of weather information in the form of distinctive sounds or prerecorded audio messages. In addition, the video/audio indicator mechanism 46 may include visual means such as a display panel for providing weather information in the form of textual information or color-coded lights. The infrared input/output device 48 provides the remote unit with the capability of interacting with other devices for performing such functions as turning on a television set to a specific channel when particular weather information is provided in a storm profile, or turning on a stereo to a particular channel for receiving additional weather information in response to particular information provided in a storm profile. The input device 50, such as a keypad, provides means by which the controller 42 can be programmed as may be desired, for instance, if the remote unit 16 is transferred from one subscriber to another. The power supply 52 provides power to the remote unit 16 for supporting operation thereof. The power supply 52 preferably provides proper power conversion capability so that the power supply may be plugged into a typical 110 volt wall outlet. Preferably, the power supply 52 also provides a battery backup for operating when there is a power outage of the power source utilized by the power supply 52. Lastly, an external control link may be provided as an alternative interface to controller 42 for purposes of programming or providing external control from a remote location. This link may comprise, for example, a dial-up modem connection that allows communication with the controller 42 from a remote location through the public switched telephone network.

While the remote unit 16 may be configured as illustrated in FIG. 3, the present invention also provides for remote units that are integrated into conventional communication devices such as wireless telephones or pagers. In this context, the distribution network 14 is determined by the type of remote unit 16. For example, if the remote unit 16 were a pager, then the distribution network 14 would be a pager network suitable for interfacing with the pager remote unit 16. Likewise, if the remote unit 16 is a cellular telephone, then the distribution network 14 would be a wireless network suitable for interfacing with the wireless remote unit 16.

II. Operation

Figure 4:
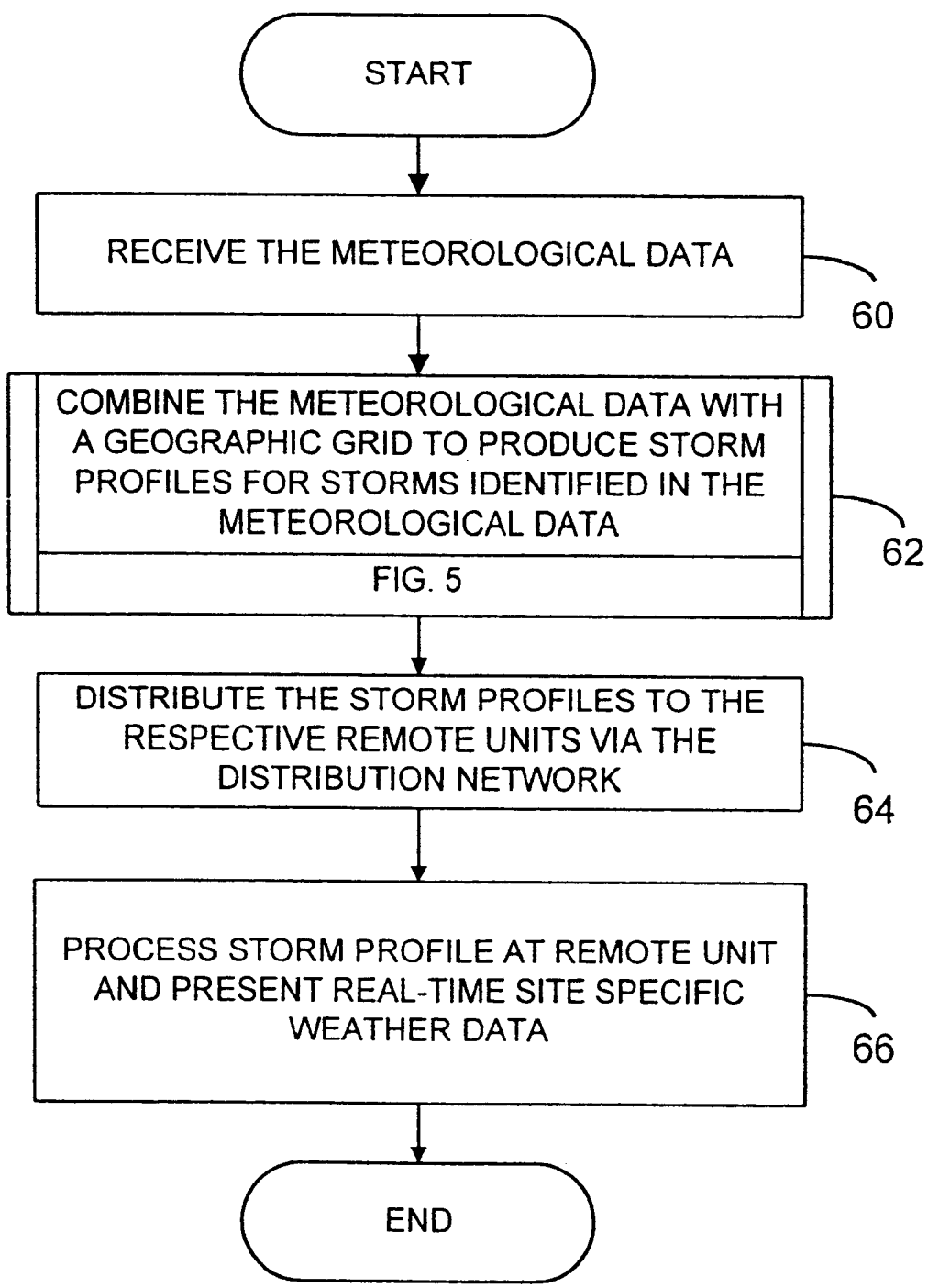
FIG. 4 is a flowchart of the operation of the system of FIG. 1.

With reference to FIG. 4, the weather alert manager 12 initially receives meteorological data including weather information defining storms within a relevant geographical area, as indicated by block 60. At block 62, the meteorological data is combined with a geographic grid to produce storm profiles for the storms identified in the meteorological data, as further described with reference to FIG. 5. Next, the storm profiles are distributed to the remote units 16 via the distribution network 14, as indicated by block 64. The storm profiles are processed at the respective remote units 16 for presentation of real-time site specific weather information, as indicated by block 66.

Figure 5:
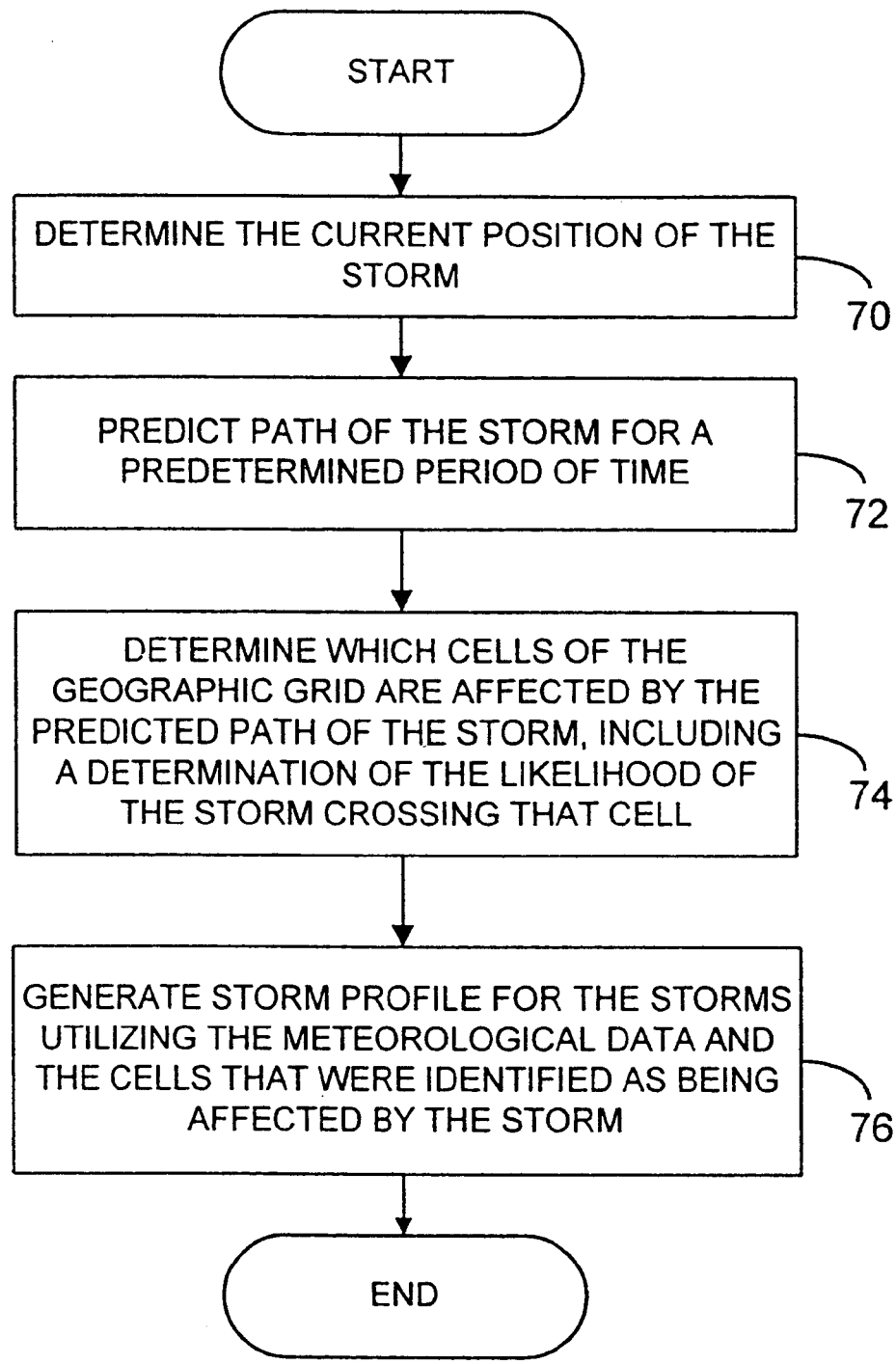
FIG. 5 is a flowchart of the operation of block 62 of FIG. 4.

With reference to FIG. 5, the operation described in block 62 (FIG. 4) is described in further detail. Particularly, the current position of a storm identified in the meteorological data is determined, as indicated by block 70. At block 72, a predicted path of the storm for a predetermined period of time is determined based upon the current position of the storm and the forecasted direction and speed of the storm. It is noted, as discussed above, that the forecasted speed and direction of the storm may be provided in the meteorological data or may be determined based upon historical movement of the storm over a discrete period of time immediately preceding the present location of the storm. At block 74, the cells within the geographical area that are affected according to the predicted path of the storm are determined. This includes the determination of the likelihood of the storm crossing each identified cell, preferably in terms of a presence qualifier. Next, storm profiles are generated for each storm utilizing the meteorological data and the cells that were determined to be affected by the storm in the previous steps, as indicated by block 76. The storm profiles are then distributed as described above.

III. Alternative Embodiments

The present invention is generally directed to a system and method for distributing event notification to a plurality of remote receiving devices capable of determining if they are affected by the event. Preferably, the event will be a phenomenon or condition that the users of the remote receiving devices wish to receive advance warning for. Hereafter, the event notification embodiment of the present invention will be described with reference to the event being a weather phenomenon such as a storm and/or a projected path of a storm. It will be understood by those skilled in the art, however, that notification for other events such as, but not limited to, forest fires, gas leaks, and the like may be provided by the system and method of this embodiment of the present invention.

Figure 6:
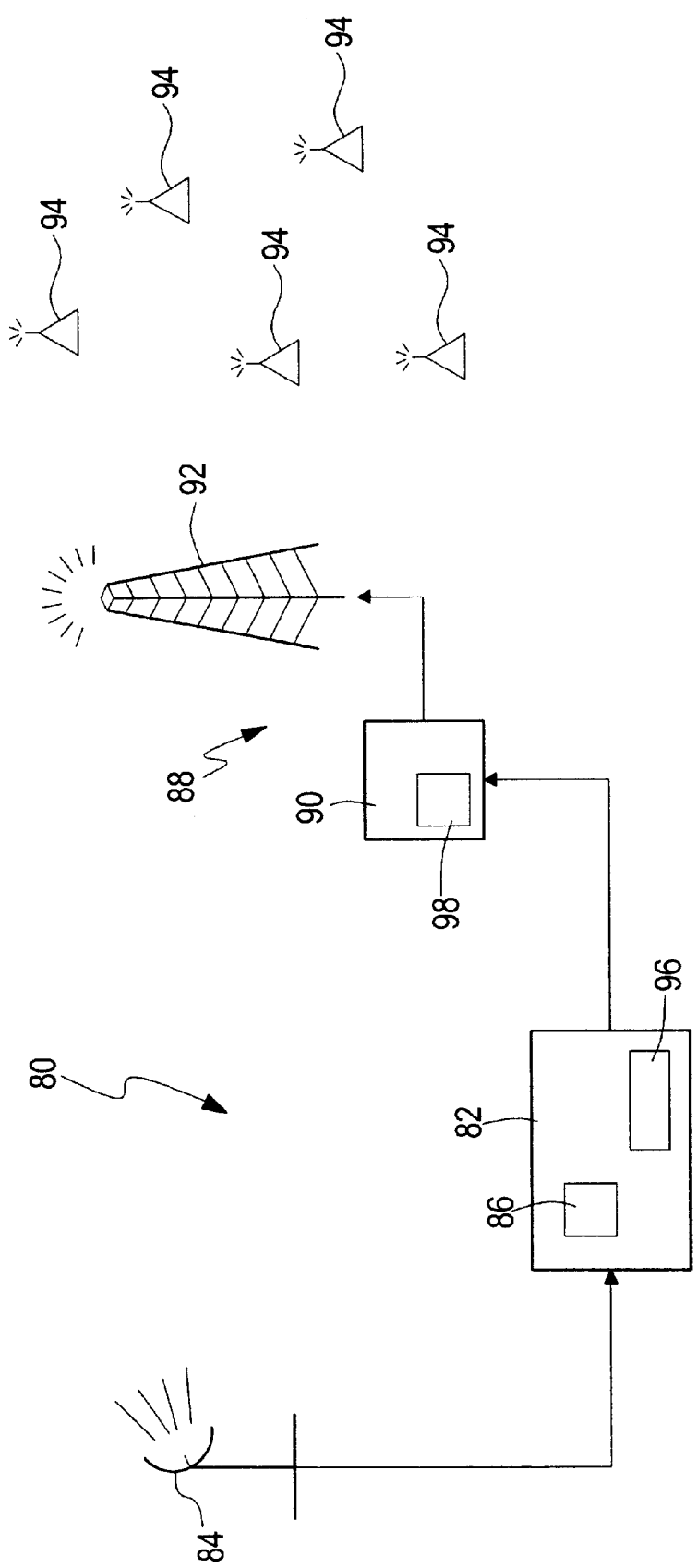
FIG. 6 is a schematic illustration of a preferred event notification system in accordance with the present invention.

Reference will now be made in detail to the event notification embodiment of the present invention, an example of which is illustrated in the accompanying drawing figures. Wherever possible the same reference numerals will be used throughout the drawing figures to refer to the same or like parts. An exemplary embodiment of the event notification system of the present invention is shown in FIG. 6, and is designated generally throughout by reference numeral 80.

In accordance with the invention, event notification system 80 preferably includes a central computer system or weather alert manager 82 configured to receive data indicative of an event to be warned for. Event data is preferably received from a source such as radar system 84 and is processed by processor 86 to define an affected area. When the event data is weather data indicative of one or more storms, processor 86 processes the data to define a storm location and a projected or anticipated storm path. A distribution site 88 including a processor such as one commonly housed in a standard personal computer 90 and a broadcasting mechanism such as a radio tower 92 communicates with central computer system 82 to receive information indicative of the boundary of the area affected by the event. The information received from central computer system 82 by distribution site 88 is then broadcast from radio tower 92 over the distribution site's entire area of coverage. A plurality of receiving devices 94 positioned within the area of coverage and remote from each other and distribution site 88 communicate with the distribution site 88 to receive information indicative of the boundary of the area affected by the event. Each of the plurality of receiving devices 94 is configured to determine if it is affected by the event and to respond accordingly.

Each receiving device 94 is preferably programmed to include or otherwise provided with information indicative of its geographic location either before or after each receiving device 94 is positioned within the coverage area. When radar data such as NexRad attribute data is received by processor 86 of computer system 82, the location of the storm (preferably in latitude and longitude) is typically provided along with a general direction and speed of travel of the storm. A storm tracking system is preferably employed to determine a projected path for the storm and define a boundary for the path of that storm via a plurality of latitude and longitude (Lat/Lon) points. That information may then be delivered to distribution site 88 via various methods, but preferably via an e-mail message over the Internet or other network connection. A standard e-mail client 96 may be preferably employed.

Exemplary storm data fields and associated values for each field provided by computer system 82, as a result of the processing, are set forth below.

[Storm3]
ID=H1r
Contents=TVS/Shear
MaxDBZ=55
InchesPerHour=7.10
AlertType=0
StormLat=35.79017
StormLon=-97.95061
alternateStormLat=35:47:25
alternateStormLon=-97:57:02
StormDirection=44
StormSpeed=43
StormLength=10
StormPathLat1=35.81476
StormPathLon1=-97.98559
alternateStormPathLat1=35:48:53
alternateStormPathLon1=-97:59:08
StormPathLat2=35.76452
StormPathLon2=-97.91775
alternateStormPathLat2=35:45:52
alternateStormPathLon2=-97:55:04
StormPathLat3=35.85384
StormPathLon3=-97.76852
alternateStonnPathLat3=35:51:14
alternateStormPathLon3=-97:46:07
StormPathLat4=35.94315
StormPathLon4=-97.87705
alternateStormPathLat4=35:56:35
alternateStormPathLon4=-97:52:37

The following table describes each of the preferred storm data fields set forth above.

| | |
|---|---|
| ID | This 3 character code identifies the storm's "name" |
| Contents | This indicates the presence of Shear or a HailCore |
| MaxDBZ | A measurement of the strength of rainfall in the storm |
| InchesPerHour | Another measurement of the strength of rainfall |
| AlertType | this code identifies the type of warning |
| StormLat | The latitude of the storm in degrees |
| StormLon | The longitude of the storm in degrees |
| alternateStormLat | The latitude of the storm in degrees, minutes, & seconds |
| alternateStormLon | The longitude of the storm in degrees, minutes, & seconds |
| StormDirection | The storm's projected direction in degrees (0 to 359) |
| StormSpeed | The storm's speed in miles per hour |
| StormLength | Distance the storm will move in 15 minutes in miles |
| StormPathLat1 | Latitude of the 1$^{st}$ point in the storm's path in degrees |
| StormPathLon1 | Longitude of the 1$^{st}$ point in the storm's path in degrees |
| alternateStormPathLat1 | Lat of 1$^{st}$ point in degrees, minutes, and seconds |
| alternateStormPathLon1 | Lon of 1$^{st}$ point in degrees, minutes, and seconds |
| StormPathLat2 | Latitude of the 2$^{nd}$ point in the storm's path in degrees |
| StormPathLon2 | Longitude of the 2$^{nd}$ point in the storm's path in degrees |
| alternateStormPathLat2 | Lat of 2$^{nd}$ point in degrees, minutes, and seconds |
| alternateStormPathLon2 | Lon of 2$^{nd}$ point in degrees, minutes, and seconds |
| StormPathLat3 | Latitude of the 3$^{rd}$ point in the storm's path in degrees |
| StormPathLon3 | Longitude of the 3$^{rd}$ point in the storm's path in degrees |
| alternateStormPathLat3 | Lat of 3$^{rd}$ point in degrees, minutes, and seconds |
| alternateStormPathLon3 | Lon of 3$^{rd}$ point in degrees, minutes, and seconds |
| StormPathLat4 | Latitude of the 4$^{th}$ point in the storm's path in degrees |
| StormPathLon4 | Longitude of the 4$^{th}$ point in the storm's path in degrees |
| alternateStormPathLat4 | Lat of 4$^{th}$ point in degrees, minutes, and seconds |
| alternateStormPathLon4 | Lon of 4$^{th}$ point in degrees, minutes, and seconds |

Once received at distribution site 88, the e-mail message is processed by software tailored to convert the Lat/Lon points defining the boundary of the storm to a format that may be transmitted via RF signals. The data is preferably encrypted and broadcast via radio tower 92 by channeling the VHF frequency band from about 150 to about 170 Mhz or the UHF band from about 850 to about 870 Mhz. Those skilled in the art will recognize, however, that other frequency bands may be used. When the broadcast signal is received by each of the plurality of remote receiving devices 94, each receiving device 94 is preferably configured to compare its location with the boundary points of the storm to determine if it is affected by the storm. More specifically, if the Lat/Lon of a given remote receiving device 94 falls within the projected storm path fan defining the boundary of the storm, the remote receiving device will determine that it is affected by the storm. If, on the other hand, the Lat/Lon of a given remote receiving device 94 falls outside of the fan, remote receiving device 94 will determine that it is not affected by the storm. The remote receiving devices 94 affected by the storm will preferably activate and emit a loud tone alert, or if desired a visual or vibration alert for those who are hearing or vision impaired, and thereafter may provide a wave file or live audio of the alert message or text message describing the type of storm and/or its intensity. Those remote receiving devices 94 not affected by the storm will not be activated and thus will not provide an alert.

In operation, NexRad attribute data, live radar data and/or weather data from other sources will be ingested and processed, for example, at central computer system 82 by a COBRA™ based storm tracking system such as one manufactured and marketed by Baron Services, Inc., Huntsville, Ala., to provide an accurate storm position, preferably in Lat/Lon and a projected storm path for some time into the future. The operation and functionality of the COBRA™ software package is described in Baron Services' marketing brochure entitled, "FasTrac, A Revolutionary New Standard in Storm Tracking Accuracy," Baron Services, Inc., August, 2000 which is hereby incorporated by reference herein. As shown in FIG. 7, central computer system 82 formats this weather data so that it may be appended to an e-mail message 100 for delivery to one or more distribution sites 88. As shown in FIG. 7, e-mail message 100 includes weather data for a single storm. It will be understood by those skilled in the art that a given e-mail message 100 may contain storm data for more than one storm.

Figure 8:
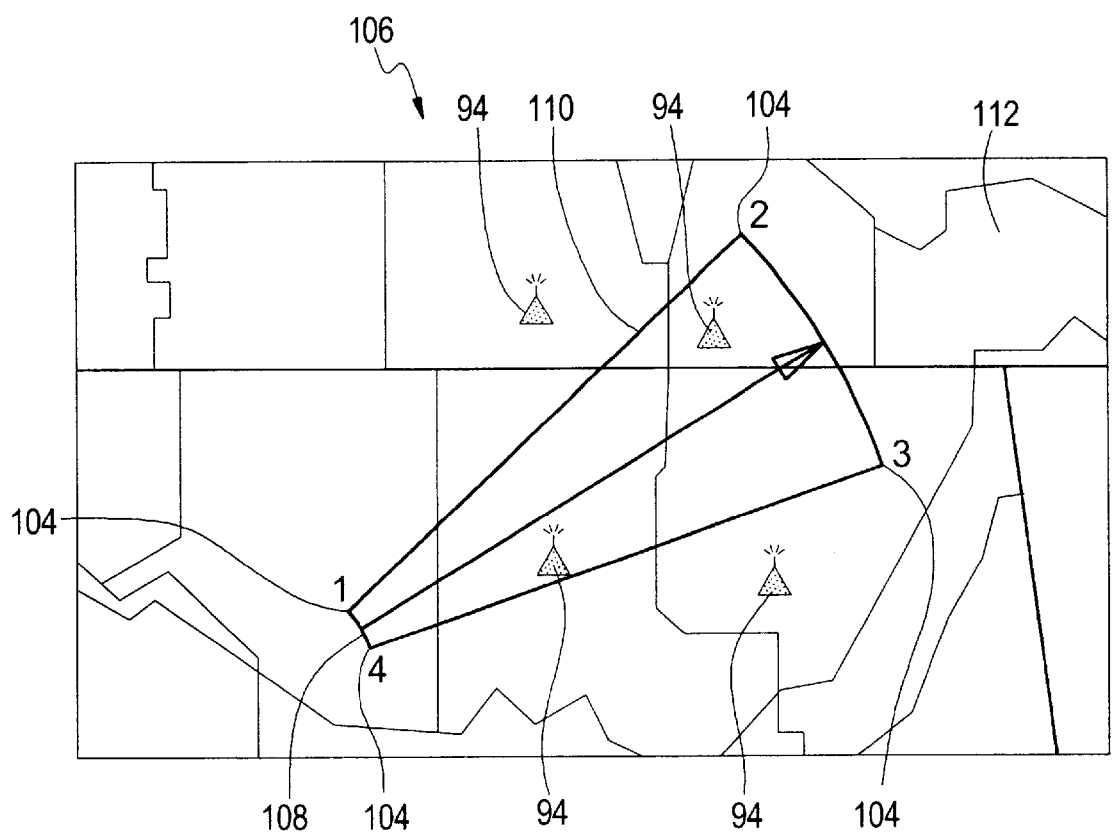
FIG. 8 is a screen grab graphically illustrating an event notification in accordance with the present invention.

As depicted in FIG. 7, among other things, e-mail message 100 includes a storm Lat/Lon 102 and a plurality of latitude and longitude points 104 derived at central computer system 82 to define the four corners of the storm's projected path. As depicted in FIG. 8, a graphical representation 106 of the storm location 108 and projected storm path 110 may be associated with a geographical map 112 to provide a graphical display of the storm information contained in e-mail message 100. The four corners of the storm 104 define the four corners of the fan which represents the projected storm path 110. Generally speaking, the storm location 108 forms the base of the fan and preferably represents the most relevant aspect of the storm.

Also depicted in FIG. 8 are a plurality of remote receiving devices 94. Although graphical representation 106 may be forwarded to distribution site 88 together with e-mail message 100, and thereafter broadcast to remote receiving devices 94, graphical representation 106 is not required for the operation of the present invention. This being said, graphical representation 106 is referenced herein to provide a better understanding of the operation of the event notification embodiment of the present invention.

Once the weather data is processed and e-mail message 100 created, e-mail message 100 is preferably delivered to distribution site 88 via a network connection. Personal computer 90 at distribution site 88 processes e-mail message 100 to derive a geographically coded data stream for broadcast from radio tower 92 to the geographic area of coverage of the system. Each remote receiving device 94 within the geographic area of coverage receives and processes the geographically coded data stream and each independently determines if it is affected by the projected storm path 110. Those remote receiving devices 94 geographically located within the storm fan defined by the four corners of the storm 104 recognize that they are affected by the projected storm path 110 and will automatically activate to emit an audible alert. Those remote receiving devices 94 geographically located outside of the storm fan will not activate. Thus, facilities such as homes, hospitals, schools and/or businesses having a remote receiving device 94 falling outside of the storm fan will not be warned and will not be unduly disturbed. Those facilities and individuals having a remote receiving device 94 falling within the storm fan will automatically be warned of the threatening storm before they are adversely impacted by the weather event. These receiving device 94 users will thus have time to react and take appropriate measures before the storm arrives.

Generally speaking, when remote receiving devices 94 are positioned within a building or other fixed structure, each device will be preprogrammed with a location identifier such as the geographical Lat/Lon of the facility via a computer serial cable or other link. Those skilled in the art, however, will recognize that remote receiving device 94 may be positioned in a moving vehicle or otherwise transported. In such cases a GPS or other position location device may be connected to remote receiving device 94 via a serial interface so that the GPS can continually stream and update Lat/Lon information to remote receiving device 94. In this way, the geographical location of remote receiving device 94 will be continually updated so that device 94 can determine if it has moved into or is moving into the projected storm path 110. Generally speaking, remote receiving device 94 will be programmed to use the most recent location (Lat/Lon) provided by the GPS to determine whether it will be affected by the storm.

It will be apparent to those skilled in the art that various modifications and variations can be made to the present invention without departing from the spirit and scope of the invention. For instance, while the present invention describes receiving devices 94 as RF receivers, one skilled in the art will recognize that cell phones, pagers, computers, personal digital assistants, and other devices, when properly programmed and configured, may function as remote receiving devices 94. In addition, receiving devices 94 may be provided with a unique electronic identification number or character so that receiving devices 94 may be selectively activated and deactivated. In this way, the system and method of the present invention may selectively activate or deactivate individual receiving devices 94 or selected groups/zones of receiving devices, as desired. Moreover, although the remote devices 94 are preferably geocoded with Lat/Lon data, the receiving devices 94 may be geocoded using some other Cartesian coordinate system. Furthermore, the system and method of the present invention may be a fully automated system, or may include a, "man in the loop" for performing various functions. The warnings and other messages provided by receiving devices 94 may direct the users of the receiving devices to a particular radio station, web site, television station, or other broadcast medium to obtain additional information relating to the storm or other event. Thus, it is intended that the present invention cover the modifications and variations of this invention provided they come within the scope of the appended claims and their equivalents.

What is claimed is:

1. An event notification system comprising:
    a computer system configured to receive data indicative of an event to be warned for and to process the data to define a boundary for an area affected by the event, the boundary for the area affected by the event comprising latitude and longitude coordinates;
    a distribution site communicating with said computer system to distribute information indicative of the boundary of the area affected by the event; and
    a plurality of receiving devices remote from said distribution site and each other communicating with said distribution site to receive the information indicative of the boundary of the area affected by the event, each of said plurality of devices configured to determine if it is affected by the event and to respond accordingly.

2. The system of claim 1 wherein the event to be warned for comprises the location and projected path of a weather phenomenon.

3. The system of claim 2 wherein the weather phenomenon comprises a severe storm.

4. The system of claim 1 wherein said distribution site comprises an RF broadcast system constructed and arranged to broadcast the information indicative of the boundary of the area affected by the event over an RF channel selected from the group consisting of a VHF frequency band or a UHF frequency band.

5. The system of claim 1 wherein each of said plurality of receiving devices affected by the event is automatically activated to emit an alert.

6. The system of claim 5 wherein said alert comprises an audible alarm followed by a severity message.

7. The system of claim 1 wherein each of said plurality of receiving devices is geographically coded with latitude and longitude information corresponding to its location, and wherein the boundary of the area affected by the event is defined by latitude and longitude coordinates so that each receiving device can compare its latitude and longitude to the event latitude and longitude to determine if it is affected by the event.

8. The system of claim 7 wherein at least one of said plurality of devices communicates with a GPS to receive updated latitude and longitude information.

9. An event notification system comprising:
 a weather alert manager configured to receive data indicative of an event to be warned for and to process said data to define a location of the event, the location of the event comprising latitude and longitude coordinates;
 a distribution site communicating with said weather alert manager to distribute data indicative of the location of the event; and
 a plurality of receiving devices remote from said distribution site and each other communicating with said distribution site to receive the data indicative of the location of the event, each of said plurality of devices configured to determine if it is affected by the event and to respond accordingly.

10. The system of claim 9 wherein the event to be warned for comprises a storm location.

11. The system of claim 10 wherein the storm location comprises the present location of the storm and the projected path of the storm.

12. The system of claim 9 wherein each of said plurality of receiving devices affected by the event is automatically activated to emit an audible alarm followed by a severity message.

13. The system of claim 9 wherein the location of the event is defined by cartesian coordinates and wherein each of said plurality of receiving devices is geographically coded with Cartesian coordinates corresponding to its location such that each receiving device compares its Cartesian coordinates to the Cartesian coordinates of the area affected by the event to determine if it is affected by the event.

14. The system of claim 13 wherein at least one of said plurality of receiving devices communicates with a GPS to receive updated Cartesian coordinate information.

15. A method of remotely activating a device, said method comprising:
 receiving data indicative of an event to be warned for;
 processing said received data to define a boundary for an area affected by the event, the boundary for the area affected by the event comprising latitude and longitude coordinates; and
 distributing information indicative of the boundary of the area affected by the event to a plurality of remote receiving devices, each of which is configured to determine if it is affected by the event and to respond accordingly.

16. The method of claim 15 wherein said receiving step comprises the step of ingesting NexRad attribute data including the location of a weather phenomenon.

17. The method of claim 16 wherein said processing step comprises the step of determining the latitude and longitude of the boundary defining a projected path of the weather phenomenon.

18. The method of claim 17 wherein said distributing step comprises the step of broadcasting an RF signal including geographically coded information indicative of the boundary of the projected path of the weather phenomenon.

19. The method of claim 18 further comprising the step of geographically coding each of said plurality of remote receiving devices with information indicative of its geographical location.

20. The method of claim 19 further comprising the steps of receiving the broadcast information at each of said plurality of remote receiving devices, and automatically emitting an alert from the remote receiving devices which determine they are affected by the projected path of the storm.

21. A mobile receiving device having stored thereon computer instructions that, when executed by a processor operable in the mobile receiving device, causes the mobile receiving device to:
 receive information indicative of an event via a communication link;
 receive location information from a coupled position location device;
 process the information indicative of the event and the location information to determine if the mobile receiving device is affected by the event; and
 responsive to determining that the mobile receiving device is affected by the event, activate an alert.

22. The mobile receiving device of claim 21, wherein the communication link comprises a satellite communication link.

23. The mobile receiving device of claim 21, wherein the information indicative of an event comprises one or more latitude and longitude points.

24. The mobile receiving device of claim 22, wherein the one or more latitude and longitude points defines a boundary for a path of the event.

25. The mobile receiving device of claim 21, wherein the information indicative of an event comprises an event profile.

26. The mobile receiving device of claim 21, wherein the information indicative of an event comprises one or more event paths.

27. The mobile receiving device of claim 21, wherein the information indicative of an event comprises a current event location.

28. The mobile receiving device of claim 21, wherein the information indicative of an event comprises an event direction.

29. The mobile receiving device of claim 21, wherein the information indicative of an event comprises an event speed.

30. The mobile receiving device of claim 21, wherein the location device comprises a GPS device.

31. The mobile receiving device of claim 21, wherein the location information comprises latitude and longitude information.

32. The mobile receiving device of claim 21, wherein the information indicative of the event is received as an RF signal via the communication link.

33. The mobile receiving device of claim 21, wherein the computer instructions that determine if the mobile receiving device is affected by the event further comprise computer instructions that, when executed by the processor operable in the mobile receiving device, causes the mobile receiving device to determine if the mobile receiving device has moved into a projected event path, wherein the information indicative of the event comprises the projected event path.

34. The mobile receiving device of claim 21, wherein the computer instructions that determine if the mobile receiving device is affected by the event further comprise computer instructions that, when executed by the processor operable in the mobile receiving device, causes the mobile receiving device to determine if the mobile receiving device is moving into or toward a projected event path, wherein the information indicative of the event comprises the projected event path.

35. The mobile receiving device of claim 21, wherein the alert comprises an audible alert.

36. The mobile receiving device of claim 21, wherein the alert comprises a visual alert.

37. The mobile receiving device of claim 21, wherein the alert varies based on a type of event.

38. The mobile receiving device of claim 21, wherein the alert varies based on a severity of the event.

39. The mobile receiving device of claim 21, wherein the alert varies based on a likelihood of the mobile receiving device being affected by the event.

40. The mobile receiving device of claim 21, wherein the computer instructions that determine if the mobile receiving device is affected by the event further comprise computer instructions that, when executed by the processor operable in the mobile receiving device, causes the mobile receiving device to display a graphical representation of the event.

41. An event notification method comprising:

providing an apparatus comprising:

an interface operable to be coupled to a position location device; a communication link interface operable to receive information via a communication link; and a controller coupled to the interface and the communication link interface, the controller operable to process a first information received via the interface and a second information received via the communication link interface;

receiving at the apparatus the first information, the first information being location information regarding the apparatus;

receiving at the apparatus the second information, the second information being information indicative of an event;

determining if the apparatus is affected by the event by processing the first information and the second information; and responsive to determining that the apparatus is affect by the event, activating an alert.

42. The method of claim 41, wherein the communication link comprises a satellite communication link.

43. The method of claim 41, wherein the mobile apparatus is coupled to a vehicle.

44. The method of claim 41, wherein the mobile apparatus is coupled to a plane.

45. The method of claim 41, wherein the mobile apparatus is coupled to a mobile communication device.

46. The method of claim 41, wherein the mobile apparatus is coupled to a portable computing device.

47. The method of claim 41 further comprising:

determining a path of the apparatus;

determining a path of the event; and determining whether the path of the event is likely to affect the path of the apparatus.

48. The method of claim 41, wherein determining if the apparatus is affected by the event comprises determining if the apparatus is currently in or approaching an area possibly affected by the event.

49. The method of claim 41, wherein determining if the apparatus is affected by the event comprises determining if the apparatus is currently in or approaching an area probably affected by the event.

50. The method of claim 41, wherein the second information being received via a RF transmission.

51. The method of claim 41, wherein the first information being received from a GPS device.

52. The method of claim 41, wherein the information indicative of an event comprises an event profile.

53. The method of claim 52, wherein the event profile comprises a storm profile.

54. The method of claim 41, wherein the event comprises a weather phenomenon.

55. The method of claim 41, wherein the event comprises a forest fire.

56. The method of claim 41, wherein the event comprises a gas leak.

57. The method of claim 41 further comprising:

determining a path of the event; and determining if the path of the event is approaching the apparatus.

58. An event notification apparatus comprising:

an interface operable to be coupled to a position location device, the interface operable to receive a location information of the apparatus;

a communication link interface operable to receive an information indicative of an event; and a controller coupled to the interface and the communication link interface, the controller operable to process the location information of the apparatus and the information indicative of the event to determine if the apparatus is affected by the event; the controller also operable to produce an alert upon determining that the apparatus is affected by the event.

59. The apparatus of claim 58, wherein the communication link interface comprises a satellite communication link.

60. The apparatus of claim 58, wherein the controller determines if the apparatus is affected by the event by processing a path of the apparatus and a path of the event.

61. The apparatus of claim 58, wherein the location information of the apparatus comprises GPS information.

62. The apparatus of claim 58, wherein the information indicative of the event comprises a plurality of latitude and longitude points.

63. The apparatus of claim 58, wherein the communication link interface is operable to receive RF signals via the satellite communication link.

64. An alert manager comprising:

a first interface operable to receive information indicative of an event;

a processor operable to perform one or more event tracking operations with the information indicative of the event to provide an event profile; and a second interface operable to transmit the event profile to a distribution network for transmitting to one or more remote devices via a satellite communication.

65. The alert manager of claim 64, wherein the first interface and the second interface are the same.

66. The alert manager of claim 64, wherein the information indicative of the event comprises information regarding the event direction and speed.

67. The alert manager of claim 64, wherein the information indicative of the event comprises one or more latitude and longitude points.

68. The alert manager of claim 64, wherein the event profile comprises information regarding a current location of the event and a forecasted direction and speed of the event.

69. A distribution network comprising:

a first interface operable to receive an event profile regarding an event;

a second interface operable to transmit the received event profile to one or more remote devices via a satellite communication link.

70. The distribution network of claim 69, wherein the one or more remote devices comprises a mobile device.

71. The distribution network of claim 69, wherein the event profile is transmitted as an RF signal via the satellite communication link.

* * * * *